US012022863B2

(12) United States Patent
Jajati

(10) Patent No.: US 12,022,863 B2
(45) Date of Patent: Jul. 2, 2024

(54) HOOKAH PIPE INTEGRATED WITH AN AUDIO OUTPUT DEVICE

(71) Applicant: Dani Jajati, Bayonne, NJ (US)

(72) Inventor: Dani Jajati, Bayonne, NJ (US)

(73) Assignee: PRIME HOOKAH INCORPORATED, Bayonne, NJ (US)

( * ) Notice: Subject to any disclaimer, the term of this patent is extended or adjusted under 35 U.S.C. 154(b) by 457 days.

(21) Appl. No.: 17/248,202

(22) Filed: Jan. 14, 2021

(65) Prior Publication Data

US 2021/0219603 A1 Jul. 22, 2021

Related U.S. Application Data

(60) Provisional application No. 62/962,681, filed on Jan. 17, 2020.

(51) Int. Cl.

| | |
|---|---|
| ***A24F 1/30*** | (2006.01) |
| ***A24F 3/00*** | (2006.01) |
| ***A24F 19/10*** | (2006.01) |
| ***H04R 1/02*** | (2006.01) |

(52) U.S. Cl.

CPC .................. *A24F 3/00* (2013.01); *A24F 1/30* (2013.01); *A24F 19/10* (2013.01); *H04R 1/028* (2013.01)

(58) Field of Classification Search

CPC ........................................................ A24F 1/30

See application file for complete search history.

(56) References Cited

U.S. PATENT DOCUMENTS

2009/0196020 A1* 8/2009 Tsai ......................... A45B 3/00 362/102
2013/0220350 A1* 8/2013 Zakayan ................... A24F 9/00 131/257
2014/0083441 A1* 3/2014 Kaplani .................. A24F 40/40 131/329
2016/0066619 A1* 3/2016 Di Carlo ................. A24F 40/50 131/329
2016/0206001 A1* 7/2016 Eng ......................... A24F 40/30
2017/0172203 A1* 6/2017 Gebara .................... A24D 1/14
2017/0251718 A1* 9/2017 Armoush .................. A24F 1/30

OTHER PUBLICATIONS

DMZ tv, "Unboxing Video E16: Husic Hookah (2018)", https://www.youtube.com/watch?v=9TUH72bmedE (Year: 2018).*

* cited by examiner

*Primary Examiner* — Cynthia Szewczyk
(74) *Attorney, Agent, or Firm* — Dunlap Bennett & Ludwig, PLLC

(57) ABSTRACT

An audio output device having a housing dimensioned and adapted so that the audio output device removably integrates with a hookah pipe, through a waterproof seal. The housing slidably receives an interconnector that connects the ashtray portion to the base portion of the hookah pipe. The audio output device may be wirelessly controlled by way of a smart device to create a user-desired audio ambiance while the user simultaneously experiences the joys of the hookah pipe.

9 Claims, 3 Drawing Sheets

HOOKAH PIPE INTEGRATED WITH AN AUDIO OUTPUT DEVICE

CROSS-REFERENCE TO RELATED APPLICATION

This application claims the benefit of priority of U.S. provisional application No. 62/962,681 filed 17 Jan. 2020, the contents of which are herein incorporated by reference.

BACKGROUND OF THE INVENTION

The present invention relates to hookahs and, more particularly, an audio output device that can be operatively combined with a hookah pipe.

Smoking from a hookah and listening to music go hand in hand, but holding a speaker and enjoying a hookah can be dexterously challenging, and is at least inconvenient to have to ensure there is an accessible music player available when an individual spontaneously wants to enjoy a hookah session.

As can be seen, there is a need for an audio output device that can be integrated and combined with a hookah pipe, wherein both components are operatively associable and dis-associable between a unitary configuration and a modular configuration, respectively. Both the hookah component and the audio output component are waterproof.

SUMMARY OF THE INVENTION

In one aspect of the present invention, a combination of a hookah pipe and of an audio output device, the combination includes the following: an upper portion of the hookah pipe; a lower portion of the hookah pipe; an interconnector having opposing ends, the opposing ends connected to said portions; a speaker housing having at least two opposing holes; and the interconnector extending completely through the at least two opposing holes; a waterproof seal at an interface of each opposing end and said portions; an ashtray support connected to the upper portion; and an audio output device support connected to the lower portion, wherein said supports receive the opposing ends; a stabilizer ring interconnected to each support in such a way as to sandwich a liquid sealing ring therebetween; a power source in the housing, wherein the power source has at least two opposing holes for slidably receiving the interconnector completely therethrough, wherein the audio output device has a light-emitting cover, wherein the audio output device is wirelessly controllable by way of a computing device, wherein the audio output device and the hookah pipe are waterproof.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an audio output device having a housing dimensioned and adapted so that the audio output device removably integrates with a hookah pipe, through a waterproof seal. The housing slidably receives an interconnector that connects the ashtray portion to the base portion of the hookah pipe. The audio output device may be wirelessly controlled by way of a smart device to create a user-desired audio ambiance while the user simultaneously experiences the joys of the hookah pipe.

Figure 1:
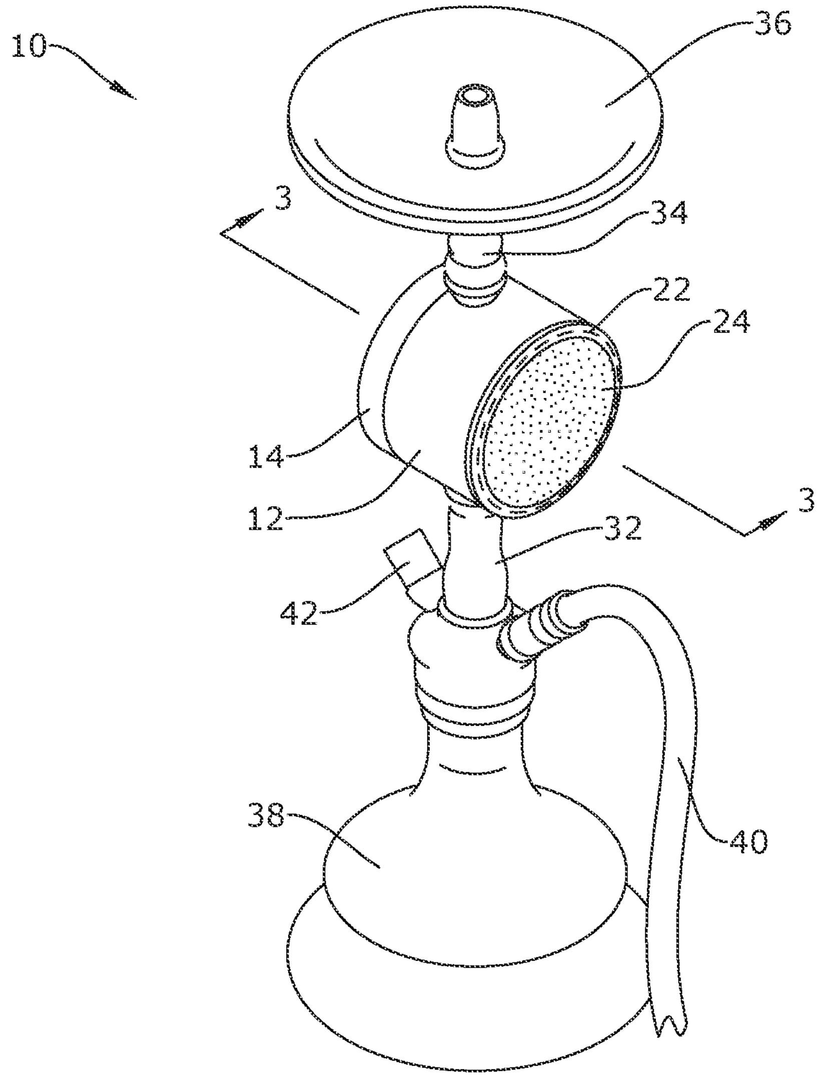
FIG. 1 is a perspective view of an exemplary embodiment of the present invention.
Figure 2:
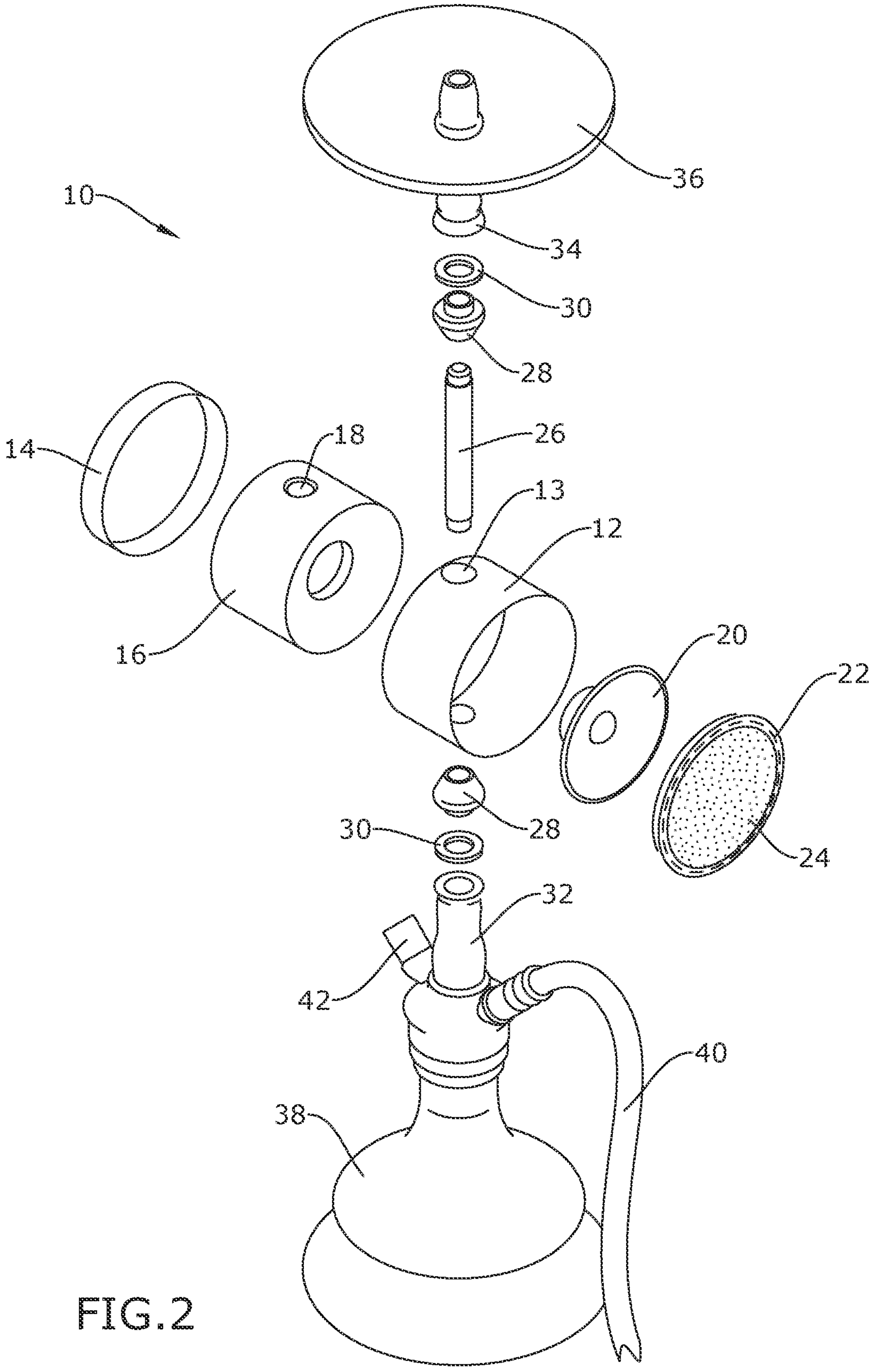
FIG. 2 is an exploded perspective view of an exemplary embodiment of the present invention.
Figure 3:
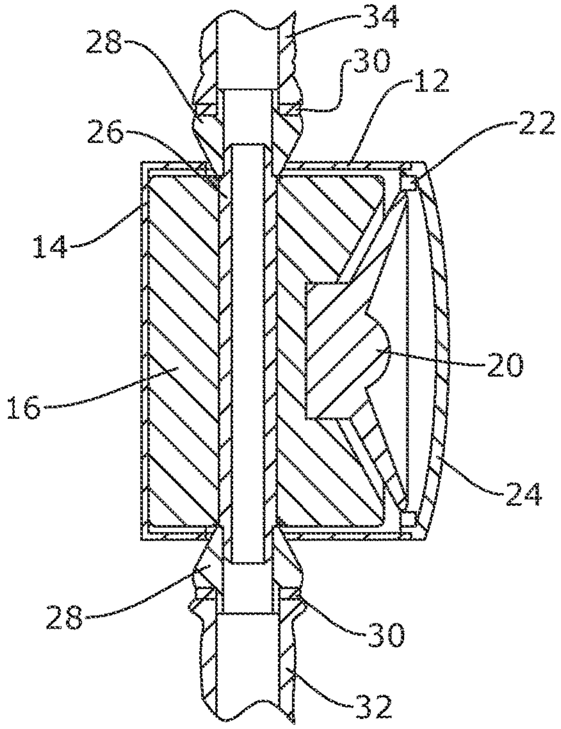
FIG. 3 is a section view of an exemplary embodiment of the present invention, taken along line 3-3 in FIG. 1.
Figure 4:
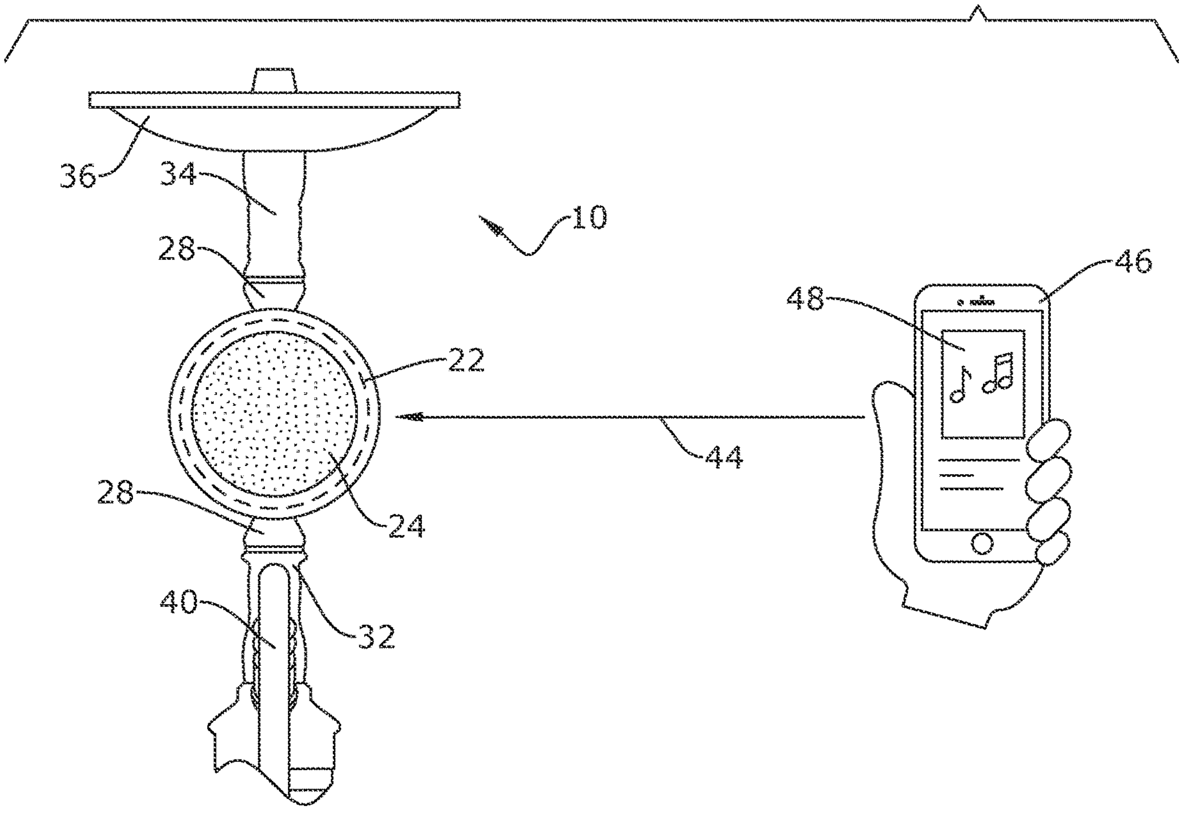
FIG. 4 is a schematic view of an exemplary embodiment of the present invention.

Referring now to FIGS. 1 through 4, the present invention may include an audio output device 20 adapted to be operatively associable and dis-associable with a hookah pipe 10, whereby the hookah pipe 10 and audio output device 20 is configurable between separate components and a combination of the hookah pipe and the audio output device 20, the combination being illustrated in FIGS. 1 through 4.

The hookah pipe 10 may include a hookah ashtray 36 connectable to a hookah base 38 by way of an interconnector 26. The hookah base 38 may include the hose 40 and the purge valve 42. The interconnector 26 may operatively associates with the hookah base 38 by way of an audio output device support 32. In certain embodiments, a lower end of the interconnector 26 slides into the audio output device support 32. A stabilizer ring 28 may connect to an upper end of the audio output device support 32 sandwiching a liquid sealing ring 30 therebetween.

A lower portion of the hookah ashtray 36 may provide an ashtray support 34 that operatively associates with an upper end of the interconnector 26. In certain embodiments, the upper end of the interconnector 26 slides into the ashtray support 34. A stabilizer ring 28 may connect to an upper end of the ashtray support 34 sandwiching a liquid sealing ring 30 therebetween.

The audio output device 20 may be housed in a speaker housing 12. The speaker housing 12 has aligned holes 13; in embodiments where the speaker housing 12 is cylindrical, the aligned holes 13 diametrically oppose each other. A power source 16 may also be housed in the speaker housing 12, and the power source 16 may provide aligned holes 18. The power source 16 may have a rear cover 14. The audio output device may have a speaker cover 24 with a light-emitting portion 22, such as a light ring.

The interconnector 26 may be an elongated cylindrical member dimensioned and adapted to slide through the aligned holes 13, 18 and into the holes provided by the opposing audio output device support 32 and ashtray support 34.

It should be understood that directional terms, such as 'upper', 'lower', 'rear', and the like can be referenced relative to the attached FIGS. For instance, upper being directed toward the top of the FIGS.

The audio output device 20 may be a speaker that is wirelessly connected, via a wireless signal 44, to a computing device 46 having a software application 48 loaded thereon for remote controlling the audio output of the audio output device 20.

Once the electronic powered audio output device 20 turns on and is connected it will allow the hookah pipe 10 to be smoked with the desired musical ambiance, which may be selectively programmed (or randomly shuffled) by way of the software application 48 on the remote computing device 46.

The present invention is adapted so that the audio output device 20 can be disassociated with the hookah pipe 10 through sliding it off the interconnector 26 when one of the interconnector 26 ends is disconnected from the audio output device support 32 or the ashtray support 34. This functionality provides the user the option of not having the combination of the hookah pipe 10 and the audio output device 20.

It should be understood, of course, that the foregoing relates to exemplary embodiments of the invention and that modifications may be made without departing from the spirit and scope of the invention as set forth in the following claims.

What is claimed is:

1. A combination of a hookah pipe and of an audio output device, the combination comprising:

an upper portion of the hookah pipe;

a lower portion of the hookah pipe;

an interconnector having opposing ends, the opposing ends connected to said portions;

a speaker housing having at least two opposing holes;

the interconnector extending completely through the at least two opposing holes;

an ashtray support connected to the upper portion;

an audio output device support connected to the lower portion, wherein said supports receive the opposing ends; and a stabilizer ring interconnected to each support in such a way as to sandwich a liquid sealing ring therebetween, wherein each stabilizer ring has a tapered portion, wherein the tapered portion protrudes through one of the two opposing holes of the speaker housing, whereby the tapered portions stabilize the speaker housing.

2. The combination of claim 1, further comprising a waterproof seal at an interface of each opposing end and said portions.

3. The combination of claim 1, further comprising a power source in the housing.

4. The combination of claim 3, wherein the power source has at least two opposing holes for slidably receiving the interconnector completely therethrough, wherein the two opposing holes of the power source and the speaker housing align.

5. The combination of claim 4, wherein the audio output device has a light-emitting cover.

6. The combination of claim 5, wherein the audio output device is wirelessly controllable by way of a computing device.

7. The combination of claim 6, wherein the audio output device and the hookah pipe are waterproof.

8. The combination of claim 7, wherein the housing is removable from the hookah pipe.

9. The combination of claim 1, wherein each opposing end of the interconnector connects to each tapered portion of the stabilizer ring, respectively, whereby the tapered portions further stabilize the speaker housing.

* * * * *